(12) United States Patent
Fang et al.

(10) Patent No.: US 8,033,697 B2
(45) Date of Patent: Oct. 11, 2011

(54) AUTOMOTIVE HEADLIGHT SYSTEM AND ADAPTIVE AUTOMOTIVE HEADLIGHT SYSTEM WITH INSTANT CONTROL AND COMPENSATION

(75) Inventors: Yi-Chin Fang, Kaohsiung (TW);
Jung-Hung Sun, Kaohsiung (TW);
Yi-Liang Chen, Kaohsiung (TW);
Wei-Chi Lai, Kaohsiung (TW);
Kuo-Ying Wu, Kaohsiung (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 431 days.

(21) Appl. No.: 12/372,945

(22) Filed: Feb. 18, 2009

(65) Prior Publication Data
US 2010/0208478 A1  Aug. 19, 2010

(51) Int. Cl.
*B60Q 1/08* (2006.01)
*F21S 8/10* (2006.01)
*F21V 13/04* (2006.01)

(52) U.S. Cl. ......... 362/466; 362/268; 362/517; 362/521

(58) Field of Classification Search .......... 362/464–469, 362/268, 276, 321, 509, 511, 512, 516, 517, 362/518, 521, 802
See application file for complete search history.

(56) References Cited

U.S. PATENT DOCUMENTS

| | | | | |
|---|---|---|---|---|
| 5,161,875 A * | 11/1992 | Sekiguchi et al. | ............. | 362/466 |
| 5,599,085 A * | 2/1997 | Tabata et al. | .................... | 362/475 |
| 5,805,119 A * | 9/1998 | Erskine et al. | ..................... | 345/7 |
| 5,931,572 A * | 8/1999 | Gotoh | ........................... | 362/466 |
| 5,938,319 A * | 8/1999 | Hege | ............................. | 362/459 |
| 6,023,365 A * | 2/2000 | McDonald | .................... | 359/291 |
| 6,084,703 A * | 7/2000 | Dewald | ......................... | 359/290 |
| 6,293,686 B1 * | 9/2001 | Hayami et al. | ................ | 362/465 |
| 6,497,503 B1 * | 12/2002 | Dassanayake et al. | ....... | 362/465 |
| 6,953,275 B2 * | 10/2005 | Ferri et al. | .................... | 362/558 |
| 6,969,183 B2 * | 11/2005 | Okubo et al. | ................. | 362/466 |
| 6,993,255 B2 * | 1/2006 | Braun et al. | .................... | 396/61 |
| 7,156,542 B2 * | 1/2007 | Miller et al. | ................... | 362/466 |

OTHER PUBLICATIONS

Chinese abstract of the Master Thesis of Mr. Yi-Liang Chen, "Optical Simulate Design and Analysis for Project with Fiber of Advanced Automotive Headlamps", Feb. 21, 2008.
English translation of the Chinese abstract of the Master Thesis of Mr. Yi-Liang Chen, "Optical Simulate Design and Analysis for Project with Fiber of Advanced Automotive Headlamps", Feb. 21, 2008.

* cited by examiner

*Primary Examiner* — Alan Cariaso
(74) *Attorney, Agent, or Firm* — WPAT, P.C.; Anthony King

(57) ABSTRACT

An automotive headlight system and an adaptive automotive headlight system with instant compensation control are provided. The automotive headlight system includes a light source, a total internal reflection prism, a digital reflecting element, a freeform lens, and a multi-curve-reflector. The total internal reflection prism is used for redirecting and reflecting light beams from the light source. The digital reflecting element is controlled to switch to a plurality of states with regard to reflected light beams from the total internal reflection prism then compensation patterns will be promptly given during different states. The freeform lens is used for controlling directions of the light beams from the digital reflecting element. The multi-curve-reflector has a plurality of radii of curvature for reflecting the light beams from the freeform lens. As the automotive headlight system merely uses optical refractive and reflecting elements so that the number of components and cost is greatly reduced as compared with the prior art. Furthermore, the most important is that this invention proposes a new design and instant and personalized compensation solution to reduce more driver's risks.

20 Claims, 3 Drawing Sheets

AUTOMOTIVE HEADLIGHT SYSTEM AND ADAPTIVE AUTOMOTIVE HEADLIGHT SYSTEM WITH INSTANT CONTROL AND COMPENSATION

BACKGROUND OF THE INVENTION

1. Field of the Invention

The present invention relates to an automotive headlight system and an adaptive automotive headlight system with instant control and compensation system, and more particular to an automotive headlight system and an adaptive automotive headlight system with instant control to compensating user's human vision by utilizing special optical components

2. Description of the Related Art

The adaptive automotive headlight system of the present invention focus on systematic safety, high efficiency and power consumption with assistance of instant control and compensation system, and more particularly in individual user's human vision compensation utilizing special optical components or other relative devices.

Definitely, this present invention will significantly reduce risks caused by fast turnaround, glare or discomfort generated by the projected illumination of automotive headlight during on road vehicles coming at the opposite direction. Conventional automotive headlight can illuminate only the ground right in front of a vehicle at a fixed manner, and has a constant brightness without consideration of individual driver's driving position, human vision characteristic and other factors. Therefore, when the vehicle turns, the driver cannot clearly see the road conditions such as dark curve. Thus, the driver cannot handle the vehicle well according to the curve, then automotive is prone to run risks of traffic accidents.

Conventionally, an advanced automotive headlight system is introduced to get rid of above disadvantages. When a vehicle is moving, headlamps of the advanced automotive headlight system can rotate according to the vehicle speed and steering angle promptly, such that the projection angle can be adjusted to illuminate the curve during driving. However, the conventional advanced automotive headlight system is handled and controlled by mechanical system, which works with mechanical connections and actuations. Therefore, the disadvantages of the conventional advanced headlight system are given that not only too many complex components, large volume, complicated to assemble, resulting in a high manufacturing cost but also lack of instant compensation function specially designed different driver's human vision characteristic, driving position and pupil of eyes etc.

Therefore, the present invention proposes a new design and instant and personalized compensation solution to reduce more risks and cost compared to the conventional mechanical model.

SUMMARY OF THE INVENTION

The present invention provides an automotive headlight system, which includes a light source, a total internal reflection prism, a digital reflecting element, a freeform lens, and a multi-curve-reflector. The light source is used for generating light beams. The total internal reflection prism is used for redirecting and totally reflecting the light beams from the light source into different directions as design requirement. The digital reflecting element is controlled to switch to a plurality of states regarding reflection of the light beams from the total internal reflection prism into different directions and then create instant patterns according to analysis from different driving situations such as different driving road, characteristic of individual user's eyes and various user's position and etc. The information might be detected by an image capture cameras or other similar cameras. The freeform lens is used for controlling and relaying light beams from the digital reflecting element. The multi-curve-reflector has a plurality of radii of curvature and is used for reflecting the light beams from the freeform lens.

The present invention works merely with the digital reflecting element (such as DMD or similar device), optical reflecting and refractive elements. Without complicated mechanical system, the number of components is greatly reduced as compared with the prior art. As such, a volume of the automotive headlight system can be effectively reduced without sacrifice of efficiency of system. The most important is that prompt compensation during driving according to individual driving position and various driving position will result in great safety for drivers and vehicles, whose response time of compensation is far less than any mechanical system so far.

The present invention further provides an adaptive automotive light illumination system, which includes an image capture apparatus, a data processing apparatus, and the above-mentioned automotive headlight system. The image capture apparatus is used not only for capturing visual data of a user such as driving position, instant pupil variety of eyes and its view direction, but also for individual human vision, which should be recorded and tested professionally before the car or driving license is given. The data processing apparatus is electrically connected to the image capture apparatus and used for receiving and processing the visual data. The digital reflecting element is electrically connected to the data processing apparatus, and is controlled by the data processing apparatus to switch to a plurality of states so as to reflect light beams from the total internal reflection prism in different directions and patterns during different states. Thus, when a vehicle is moving, the adaptive automotive headlight system can maintain an optimal brightness at any moment, and adjust the brightness at any moment according to the information detected like road condition, the vehicle speed, the turning radius, obstacles and the like according to data derived, so as to ensure the safety of the user.

DETAILED DESCRIPTION OF THE INVENTION

Figure 1:
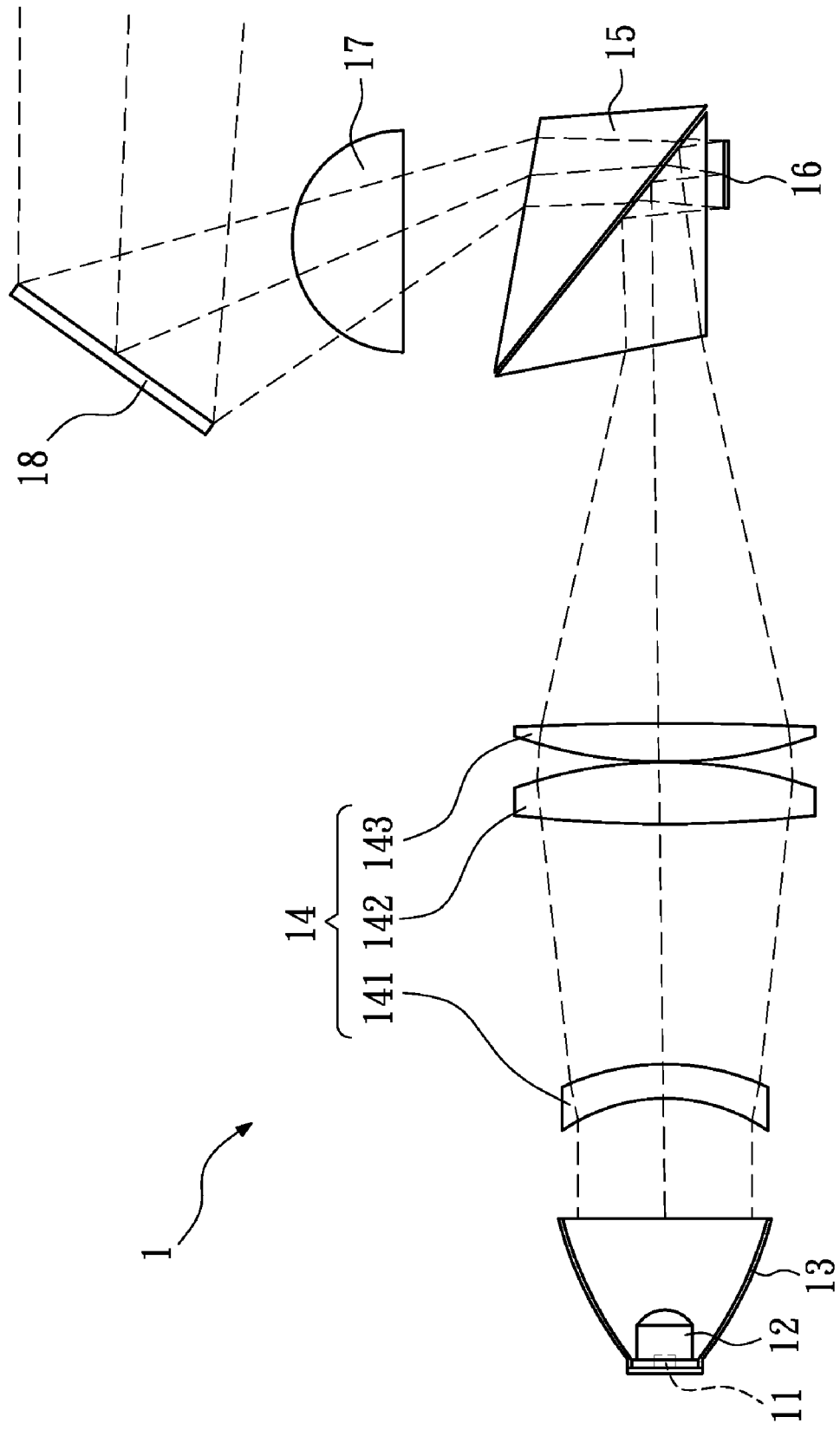
FIG. 1 is a schematic view of an automotive headlight system of the present invention.

FIG. 1 shows a schematic view of an automotive headlight system of the present invention. The automotive headlight system 1 includes a light source 11, a collimator optics 12, a convergent mirror 13, a convergent lens set 14, a total internal reflection prism 15, a digital reflecting element 16, a freeform lens 17, and a multi-curve-reflector 18.

The light source 11 is used for generating light beams. In this embodiment, the light source 11 might be light-emitting diode (LED) or collimated laser diode. The collimator optics 12 covers the light source 11 and is used for improving the light collection efficiency. The convergent mirror 13 surrounds the light source 11 and is used for reflecting the light beams from the light source 11, such that the light beams are emitted in parallel. In this embodiment, the convergent mirror 13 is a parabolic mirror with a focal point, and the light source 11 is located at the focal point. The convergent lens set 14 is located between the convergent mirror 13 and the total internal reflection prism 15, and is used for converging and refocusing the light beams from the convergent mirror 13. In this embodiment, the convergent lens set 14 includes a concave lens 141, a first convex lens 142, and a second convex lens 143 in subsequence.

The total internal reflection prism 15 is used for redirecting and totally reflecting the light beams from the convergent lens set 14. In this embodiment, the light source 11, the collimator optics 12, the convergent mirror 13, the convergent lens set 14, and the total internal reflection prism 15 are arranged in a row. The digital reflecting element 16 is located below the total internal reflection prism 15, the freeform lens 17 is located above the total internal reflection prism 15, and the multi-curve-reflector 18 is located above the freeform lens 17.

The size of the digital reflecting element 16 is smaller than that of the total internal reflection prism 15. The digital reflecting element 16 is controlled to switch to a plurality of states, so as to reflect the light beams from the total internal reflection prism 15 into different directions and patterns during different states. The digital reflecting element 16 may be a digital micromirror device (DMD), a liquid crystal on silicon (LCOS) panel, a complementary liquid crystal device, or the like.

In this embodiment, the digital reflecting element 16 is a DMD having a reference surface and a plurality of micromirrors. The micromirrors are rotatable in three different directions such that the DMD can be switched to a plurality of states.

The freeform lens 17 is used for controlling directions of the light beams from the digital reflecting element 16, such that light beams reflected by the digital reflecting element 16 in different states can be all projected to the multi-curve-reflector 18. Preferably, the freeform lens 17 a provided with a relay lens (not shown), which is used for relaying directions of the light beams from the digital reflecting element 16.

Figure 2:
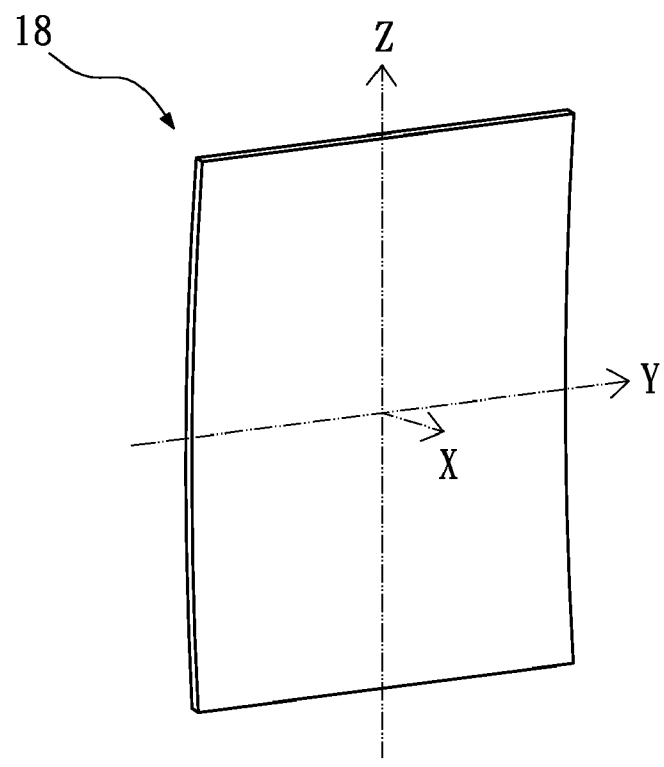
FIG. 2 is a schematic perspective view of a multi-curve-reflector of the present invention.
Figure 3:
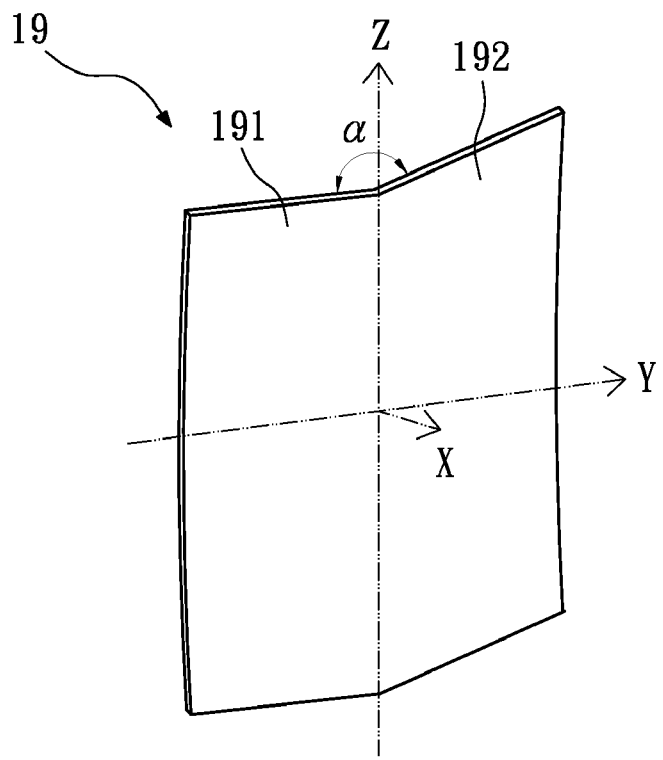
FIG. 3 is a schematic perspective view of another example of the multi-curve-reflector of the present invention.

FIG. 2 shows a schematic perspective view of a multi-curve-reflector of the present invention. The multi-curve-reflector 18 has a plurality of radii of curvature, and is used for reflecting the light beams from the freeform lens 17. In this embodiment, the multi-curve-reflector 18 has an X-axis curvature and a Y-axis curvature different from the X-axis curvature. FIG. 3 shows a schematic perspective view of another example of the multi-curve-reflector of the present invention. Preferably, the multi-curve-reflector 19 has a first portion 191 and a second portion 192, and an angle α is formed between the first portion 191 and the second portion 192.

The operation of the automotive headlight system 1 is as follows. Referring to FIG. 1, the light beams emitted from the light source 11 are emitted in parallel by the collimator optics 12 and the convergent mirror 13, refocused by the convergent lens set 14, and then totally reflected to the digital reflecting element 16 (for example, a DMD) by the total internal reflection prism 15. Then, the light beams from the digital reflecting element 16 are projected to the multi-curve-reflector 18 by the freeform lens 17. Finally, the multi-curve-reflector 18 reflects and projects the light beams from the freeform lens 17.

The automotive headlight system 1 of the present invention has the following advantages. A user can obtain the desired light pattern and direction simply by controlling the states of the digital reflecting element 16. Moreover, as the automotive headlight system 1 merely includes optical lenses and optical reflecting elements, the number of components is greatly reduced as compared with the prior art. As such, the volume of the automotive headlight system 1 can be effectively reduced with better compensation effects.

Figure 4:
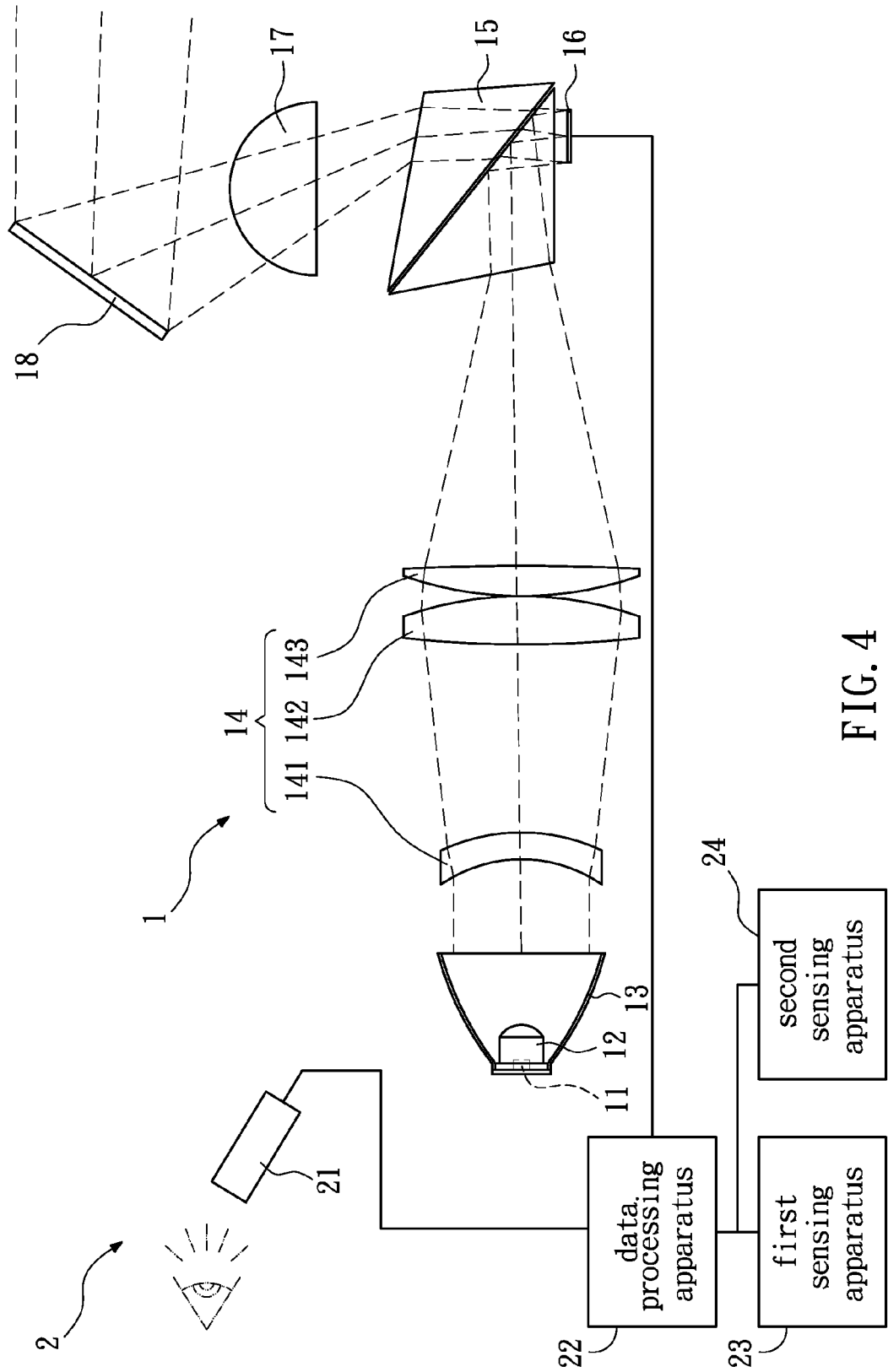
FIG. 4 is a schematic view of an adaptive automotive headlight system of the present invention.

FIG. 4 shows a schematic view of an adaptive automotive headlight system of the present invention. The adaptive automotive headlight system 2 includes an image capture apparatus 21, a data processing apparatus 22, a first sensing apparatus 23, a second sensing apparatus 24, and the automotive headlight system 1 (FIG. 1).

The active adaptive automotive headlight system 2 is disposed within a vehicle (not shown), and a user is located in the vehicle (for example, seated on a driver seat). The image capture apparatus 21 is used for capturing visual data of the user, for example, a height of eyes of the user, a size of pupils of the eyes of the user, and horizontal positions of the eyes of the user. In this embodiment, the image capture apparatus 21 includes at least one charge coupled device (CCD) or a complementary metal-oxide semiconductor (CMOS) image sensor. In other application, the visual data is recorded in a user's license, a memory or the data processing apparatus 22.

The data processing apparatus 22 is electrically connected to the image capture apparatus 21, and is used for receiving and processing the visual data from the image capture apparatus 21. In this embodiment, the data processing apparatus 22 is a computer.

The first sensing apparatus 23 and the second sensing apparatus 24 are both electrically connected to the data processing apparatus 22. The first sensing apparatus 23 senses a brightness outside the vehicle and transmits the brightness to the data processing apparatus 22. The second sensing apparatus 24 senses a speed and a turning radius of the vehicle, and transmits the speed and the turning radius to the data processing apparatus 22.

The automotive headlight system 1 is the same as that of FIG. 1, and includes the light source 11, the collimator optics 12, the convergent mirror 13, the convergent lens set 14, the total internal reflection prism 15, the digital reflecting element 16, the freeform lens 17, and the multi-curve-reflector 18. The digital reflecting element 16 is electrically connected to the data processing apparatus 22, and is controlled by the data processing apparatus 22 to switch to a plurality of states, so as to reflect light beams from the total internal reflection prism 15 into different directions and patterns during different states.

In the present invention, the data processing apparatus 22 simulates an optimal visual effect of the user according to data from the image capture apparatus 21, the first sensing apparatus 23, and the second sensing apparatus 24, and then controls the digital reflecting element 16 according to the simulated optimal visual effect. Thus, when the vehicle is moving, the adaptive automotive headlight system 2 can maintain optimal brightness at any moment, and adjust the brightness at any moment according to the road condition, the vehicle speed, the turning radius, obstacles and the like, so as to ensure the safety of the user.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. An adaptive automotive headlight system, comprising:
   an image capture apparatus, for capturing visual data of a user;
   a data processing apparatus, electrically connected to the image capture apparatus, for receiving and processing the visual data;
   a light source, for generating light beams;
   a total internal reflection prism, for redirecting and totally reflecting the light beams from the light source;
   a digital reflecting element, electrically connected to the data processing apparatus, and controlled by the data processing apparatus to switch to a plurality of states so as to reflect the light beams from the total internal reflection prism into different directions and patterns during different states;
   a freeform lens, for controlling directions of the light beams from the digital reflecting element; and
   a multi-curve-reflector, having a plurality of radii of curvature, for reflecting the light beams from the freeform lens.

2. The adaptive automotive headlight system according to claim 1, where in the image capture apparatus comprises at least one charge coupled device (CCD) or a complementary metal-oxide semiconductor (CMOS) image sensor.

3. The adaptive automotive headlight system according to claim 1, wherein the visual data comprises a height of eyes of the user, a size of pupils of the eyes of the user, and horizontal positions of the eyes of the user.

4. The adaptive automotive headlight system according to claim 3, wherein the visual data is recorded in a user's license or the data processing apparatus.

5. The adaptive automotive headlight system according to claim 1, wherein the user is located in a vehicle, the adaptive automotive headlight system further comprises a first sensing apparatus and a second sensing apparatus both electrically connected to the data processing apparatus, the first sensing apparatus senses brightness outside the vehicle and transmits the brightness to the data processing apparatus, and the second sensing apparatus senses a speed and a turning radius of the vehicle and transmits the speed and the turning radius to the data processing apparatus.

6. The adaptive automotive headlight system according to claim 1, wherein the data processing apparatus is a computer.

7. The adaptive automotive headlight system according to claim 1, wherein the data processing apparatus is used for simulating an optimal visual effect of the user and controlling the digital reflecting element according to the optimal visual effect of the user.

8. The adaptive automotive headlight system according to claim 1, further comprising a convergent mirror, a convergent lens set and a relay lens, wherein the convergent mirror surrounds the light source and is used for reflecting the light beams from the light source, such that the light beams are emitted in parallel, the convergent lens set is located between the convergent mirror and the total internal reflection prism and is used for converging the light beams from the convergent mirror, and the relay lens is used for relaying directions of the light beams from the digital reflecting element.

9. The adaptive automotive headlight system according to claim 8, wherein the convergent mirror is a parabolic mirror with a focal point, and the light source is located at the focal point.

10. The adaptive automotive headlight system according to claim 8, wherein the convergent lens set comprises a concave lens, a first convex lens, and a second convex lens in subsequence.

11. The adaptive automotive headlight system according to claim 1, further comprising a collimator optics covering the light source.

12. The adaptive automotive headlight system according to claim 1, wherein the digital reflecting element is a digital micromirror device (DMD), a liquid crystal on silicon (LCOS) panel, or a complementary liquid crystal device.

13. The adaptive automotive headlight system according to claim 1, wherein the multi-curve-reflector has a first portion and a second portion, and an angle is formed between the first portion and the second portion.

14. An automotive headlight system, comprising:
    a light source, for generating light beams;
    a total internal reflection prism, for redirecting and totally reflecting the light beams from the light source;
    a digital reflecting element, controlled to switch to a plurality of states so as to reflect the light beams from the total internal reflection prism into different directions and patterns during different states;
    a freeform lens, for controlling directions of the light beams from the digital reflecting element; and
    a multi-curve-reflector, having a plurality of radii of curvature, for reflecting the light beams from the freeform lens.

15. The automotive headlight system according to claim 14, further comprising a convergent mirror, a convergent lens set and a relay lens, wherein the convergent mirror surrounds the light source and is used for reflecting the light beams from the light source such that the light beams are emitted in parallel, the convergent lens set is located between the convergent mirror and the total internal reflection prism and is used for converging light beams from the convergent mirror, and the relay lens is used for relaying directions of the light beams from the digital reflecting element.

16. The automotive headlight system according to claim 15, wherein the convergent mirror is a parabolic mirror with a focal point, and the light source is located at the focal point.

17. The automotive headlight system according to claim 15, wherein the convergent lens set comprises a concave lens, a first convex lens, and a second convex lens in subsequence.

18. The automotive headlight system according to claim 14, further comprising a collimator optics covering the light source.

19. The automotive headlight system according to claim 14, wherein the digital reflecting element is a digital micromirror device (DMD), a liquid crystal on silicon (LCOS) panel, or a complementary liquid crystal device.

20. The automotive headlight system according to claim 14, wherein the multi-curve-reflector has a first portion and a second portion, and an angle is formed between the first portion and the second portion.

* * * * *